US008999095B2

(12) United States Patent
Sauter et al.

(10) Patent No.: US 8,999,095 B2
(45) Date of Patent: Apr. 7, 2015

(54) APPARATUS AND METHOD FOR PLY BONDING AS WELL AS MULTI-PLY PRODUCT

(75) Inventors: Jurgen Sauter, Mannheim (DE); Harald Harlacher, Mannheim (DE); Joachim Leonhardt, Mannheim (DE); Thomas Heilemann, Frankenthal (DE)

(73) Assignee: SCA Hygiene Prodcuts GmbH, Mannheim (DE)

( * ) Notice: Subject to any disclaimer, the term of this patent is extended or adjusted under 35 U.S.C. 154(b) by 755 days.

(21) Appl. No.: 13/003,613

(22) PCT Filed: Aug. 7, 2008

(86) PCT No.: PCT/EP2008/060388

§ 371 (c)(1), (2), (4) Date: Jan. 11, 2011

(87) PCT Pub. No.: WO2010/015280

PCT Pub. Date: Feb. 11, 2010

(65) Prior Publication Data

US 2011/0117327 A1 May 19, 2011

(51) Int. Cl.
*B32B 37/00* (2006.01)
*B31F 1/07* (2006.01)

(52) U.S. Cl.
CPC ........... *B31F 1/07* (2013.01); *B31F 2201/0733* (2013.01); *B31F 2201/0738* (2013.01); *B31F 2201/0789* (2013.01)

(58) Field of Classification Search
USPC ................. 156/209, 219, 553, 555, 580, 582, 156/583.1; 428/156, 172, 195.1, 198
See application file for complete search history.

(56) References Cited

U.S. PATENT DOCUMENTS

| | | | | |
|---|---|---|---|---|
| 3,264,978 A | | 8/1966 | Staley | |
| 4,902,553 A | * | 2/1990 | Hwang et al. | 428/156 |
| 5,846,636 A | | 12/1998 | Ruppel et al. | |
| 6,106,928 A | | 8/2000 | Laurent et al. | |
| 6,454,693 B1 | | 9/2002 | Harlacher et al. | |

(Continued)

FOREIGN PATENT DOCUMENTS

| | | |
|---|---|---|
| DE | 20 2007 006 100 U1 | 8/2007 |
| EP | 0 765 215 B1 | 3/1999 |

(Continued)

OTHER PUBLICATIONS

International Search Report, dated Aug. 6, 2009, from corresponding PCT application.

*Primary Examiner* — James Sells
(74) *Attorney, Agent, or Firm* — Buchanan Ingersoll & Rooney PC

(57) ABSTRACT

Apparatus for bonding at least two plies of fibrous web, includes: a first roller having an outer periphery, a plurality of embossing protuberances being provided on the outer periphery, such first roller being an embossing roller; and a second roller having an outer periphery and being elastic at least in a radial direction and together with the first roller forming a nip through which the at least two plies are be fed, such second roller being a counter roller or a marrying roller, wherein at least a part of the outer periphery of at least one of the first and the second roller is irregularly rough so that the at least two plies are bonded at discrete locations corresponding to at least some of the embossing protuberances. A multi-ply product including the bonded plies and a corresponding method are also described.

26 Claims, 2 Drawing Sheets

(56) References Cited

U.S. PATENT DOCUMENTS

| | | | | |
|---|---|---|---|---|
| 7,815,764 | B2 * | 10/2010 | Perini | 156/209 |
| 8,312,909 | B2 * | 11/2012 | Perini | 156/553 |
| 2004/0170813 | A1 * | 9/2004 | Digiacomantonio et al. | 428/195.1 |
| 2006/0070714 | A1 | 4/2006 | Perini | |
| 2009/0288757 | A1 * | 11/2009 | Perini | 156/157 |

FOREIGN PATENT DOCUMENTS

| | | | |
|---|---|---|---|
| EP | 1 155 815 | A1 | 11/2001 |
| JP | 63-034070 | A | 2/1988 |
| WO | 99/33646 | A1 | 7/1999 |
| WO | 2004/065113 | A1 | 8/2004 |
| WO | 2006/136186 | A1 | 12/2006 |

* cited by examiner

APPARATUS AND METHOD FOR PLY BONDING AS WELL AS MULTI-PLY PRODUCT

TECHNICAL FIELD

The present invention relates to the field of ply bonding and particularly to the field of ply bonding without the use of adhesive (glue). More particularly the present invention relates to an apparatus for bonding at least two plies of a fibrous web and a corresponding method. The invention further relates to a hygiene or wiping product comprising at least two plies and obtainable by such a method.

The fibrous web may be tissue paper or nonwoven. In the apparatus, method and product of the present invention, plies of the same or a different material may be combined.

A tissue paper is defined as a soft absorbent paper having a low basis weight. One generally selects a basis weight of 8 to 40 g/m2, especially 10 to 25 g/m2 per ply. The total basis weight of multiple-ply tissue products is preferably equal to a maximum of 120 g/m2, more preferably to a maximum of 100 $g/m^2$ and most preferably to a maximum of 55 g/m2. Its density is typically below 0.6 g/cm3, preferably below 0.30 g/cm3 and more preferably between 0.08 and 0.20 g/cm3.

The production of tissue is distinguished from paper production by its extremely low basis weight and its much higher tensile energy absorption index (see DIN EN 12625-4 and DIN EN 12625-5). Paper and tissue paper also differ in general with regard to the modulus of elasticity that characterizes the stress-strain properties of these products as a material parameter.

A tissue's high tensile energy absorption index results from the outer or inner creping. The former is produced by compression of the paper web adhering to a dry cylinder as a result of the action of a crepe doctor or in the latter instance as a result of a difference in speed between two wires ("fabrics"). This causes the still moist, plastically deformable paper web to be internally broken up by compression and shearing, thereby rendering it more stretchable under load than an uncreped paper.

Moist tissue paper webs are usually dried by the so-called Yankee drying, the through air drying (TAD) or the impulse drying method.

The fibers contained in the tissue paper are mainly cellulosic fibres, such as pulp fibers from chemical pulp (e.g. Kraft sulfite or sulfate pulps), mechanical pulp (e.g. ground wood), thermo mechanical pulp, chemo-mechanical pulp and/or chemo-thermo mechanical pulp (CTMP). Pulps derived from both deciduous (hardwood) and coniferous (softwood) can be used. The fibers may also be or include recycled fibers, which may contain any or all of the above categories. The fibers can be treated with additives—such as fillers, softeners, such as quaternary ammonium compounds and binders, such as conventional dry-strength agents or wet-strength agents used to facilitate the original paper making or to adjust the properties thereof. The tissue paper may also contain other types of fibers, e.g. regenerated cellulosic fibres or annual plant fibres such as sisal, hemp or bamboo fibres, or synthetic fibers enhancing, for instance, strength, absorption, smoothness or softness of the paper.

If tissue paper is to be made out of pulp, the process essentially comprises a forming that includes a box and a forming wire portion, and a drying portion (either through air drying or conventional drying on a yankee cylinder). The production process also usually includes the crepe process essential for tissues and, finally, typically a monitoring and winding area.

Paper can be formed by placing the fibers, in an oriented or random manner, on one or between two continuously revolving wires of a paper making machine while simultaneously removing the main quantity of water of dilution until dry-solids contents of usually between 12 and 35% are obtained.

Drying the formed primary fibrous web occurs in one or more steps by mechanical and thermal means until a final dry-solids content of usually about 93 to 97% has been reached. In case of tissue making, this stage is followed by the crepe process which crucially influences the properties of the finished tissue product in conventional processes. The conventional dry crepe process involves creping on a usually 4.0 to 6.5 m diameter drying cylinder, the so-called yankee cylinder, by means of a crepe doctor with the aforementioned final dry-solids content of the raw tissue paper. Wet creping can be used as well, if lower demands are made of the tissue quality. The creped, finally dry raw tissue paper, the so-called base tissue, is then available for further processing into the paper product for a tissue paper product.

Instead of the conventional tissue making process described above, the use of a modified technique is possible in which an improvement in specific volume is achieved by a special kind of drying which leads to an improvement in the bulk softness of the tissue paper. This process, which exists in a variety of subtypes, is termed the TAD (Through Air Drying) technique. It is characterized by the fact that the "primary" fibrous web that leaves the forming and sheet making stage is pre-dried to a dry-solids content of about 80% before final contact drying on the yankee cylinder by blowing hot air through the fibrous web. The fibrous web is supported by an air-permeable wire or belt or TAD-fabric and during its transport is guided over the surface of an air-permeable rotating cylinder drum, the so-called TAD-cylinder. Structuring the supporting wire or belt makes it possible to produce any pattern of compressed zones broken up by deformation in the moist state, also named moulding, resulting in increased mean specific volumes and consequently leading to an increase of bulk softness without decisively decreasing the strength of the fibrous web.

The term non-woven (ISO 9092, DIN EN 29092) is applied to a wide range of products which, in terms of their properties, are located between those of paper (cf. DIN 6730, May 1996) and cardboard (DIN 6730) on the one hand, and textiles on the other hand. As regards non-woven a large number of extremely varied production processes are used, such as the air-laid and spun-laced techniques as well as wet-laid techniques. The non-woven includes mats, non-woven fabrics and finished products made thereof. Non-wovens may also be called textile-like composite materials, which represent flexible porous fabrics that are not produced by the classic methods of weaving warp and weft or by looping. In fact, non-wovens are produced by intertwining, cohesive or adhesive bonding of fibres, or a combination thereof. The non-woven material can be formed of natural fibres, such as cellulose or cotton fibres, but can also consist of synthetic fibres, such as polyethylene (PE), polypropylene (PP), polyurethane (PU), polyester, nylon or regenerated cellulose, or a mix of different fibres. The fibres may, for example, be present in the form of endless fibres of pre-fabricated fibres of a finite length, as synthetic fibres produced in situ, or in the form of staple fibres. The nonwovens according to the invention may thus consist of mixtures of synthetic and cellulose fibrous material, e.g. natural vegetable fibres (see ISO 9092, DIN EN 29092).

The fibrous web may be converted to the final hygiene or wiping product in many ways, for example, by embossing and/or laminating it into a multi-ply product, rolled or folded.

Hygiene or wiping products primarily include all kinds of dry-creped tissue paper, wet-creped paper, TAD-paper (Through Air Drying) and cellulose or pulp-wadding or all kinds of non-wovens, or combinations, laminates or mixtures thereof. Typical properties of these hygiene and wiping products include the reliability to absorb tensile stress energy, their drapability, good textile-like flexibility, properties which are frequently referred to as bulk softness, a higher surface softness and a high specific volume with a perceptible thickness. A liquid absorbency as high as possible and, depending on the application, a suitable wet and dry strength as well as an appealable visual appearance of the outer product's surface are desired. These properties, among others, allow these hygiene and wiping products to be used, for example, as cleaning wipes such as paper or non-woven wipes, windscreen cleaning wipes, industrial wipes, kitchen paper or the like; as sanitary products such as for example bathroom tissue, tissue paper or non-woven handkerchiefs, household towels, towels and the like; as cosmetic wipes such as for example facials and as serviettes or napkins, just to mention some of the products that can be used. Furthermore, the hygiene and wiping products can be dry, moist, wet, printed or pretreated in any manner. In addition, the hygiene and wiping products may be folded, interleaved or individually placed, stacked or rolled, connected or not, in any suitable manner.

Due to the above description, the products can be used for personal and household use as well as commercial and industrial use. They are adapted to absorb fluids, remove dust, for decorative purposes, for wrapping or even just as supporting material, as is common for example in medical practices or in hospitals.

To produce multi-ply tissue paper products, such as handkerchiefs, bathroom paper, towels or household towels, an intermediate step often occurs with so-called doubling in which the base tissue in the desired number of plies of a finished product is usually gathered on a common multi-ply mother reel. It is understood that (multi-ply) tissue paper products of different (multi-ply) mother reels can be further combined in subsequent converting steps.

In the final hygiene or wiping product one or more of the fibrous webs may be combined. Thereby webs of the same material, for example tissue paper or nonwoven may be combined or webs of different materials may be combined thereby forming hybrid products. In the latter a tissue paper may be combined with a nonwoven. In addition, one ply in itself may be a hybrid in regard that different types of fibres (tissue cellulosic fibres and non-woven fibres) are used in one and the same ply. A hybrid product may also be obtained in that tissue paper plies which are manufactured by different methods (for example TAD and conventional) may be combined.

BACKGROUND ART

One of various possibilities to achieve ply bonding between at least two plies of tissue paper without the use of glue is disclosed in WO-A-99/33646. The known device comprises two rollers forming a nip through which at least two plies which are to be bonded are fed. At least the outer periphery of one of the rollers is entirely covered with abrasive material such as the material used for sandpaper so as to achieve an irregular rough surface. This abrasive material is pressed into the nipped plies, whereby ply bonding is achieved.

However, an irregular rough surface structure is imprinted into at least one of the plies over the entire surface. Therefore, the outer appearance of the combined plies is irregular or the ply bonding is (almost) not visible. In addition, it will not be possible to create volume between the plies by embossing and even pre-embossed webs with a defined thickness would be flattened by compressing of the ply.

To enhance the visual appearance of the bonded plies, WO-A-99/33646 additionally suggests a subsequent embossing step. The subsequent embossing requires additional devices with the associated additional steps. This, in turn, increases the complexity of the apparatus and, hence, the manufacturing costs of the final product.

SUMMARY OF THE INVENTION

In view of the aforesaid, it is, therefore, the object of the present invention to provide an apparatus and a method for bonding at least two plies of a fibrous web (fibrous plies) without the use of adhesive, which enable the visual appearance of the bonded plies to be enhanced and the overall costs of the final product to be reduced. A further object is to provide a product that compared to the product obtained from a prior art apparatus and method as described above is improved in regard of its visual appearance, bulk (volume) and/or softness. Compared with conventional edge (border) embossing mainly used for hankies and napkins the resulting product should have an improved ply bonding when the width of the paper roll exceeds 1 m. Compared with the knurling technique, the resulting product is characterized by an improved optical appearance especially with large motives.

According to the invention, ply bonding should be carried out without using adhesives such as glue, starch, modified starch or carboxylmethylcellulose or without using adhesives based on polymers such as polyvinylalcohols, polyvinylacetates, polyurethanes, polystyrenes or based on polymers comprising acrylic or methacrylic acid.

This object is solved by an apparatus of the present invention as defined in claim 1, a method having the features of claim 20 and a fibrous product according to claim 22 or 24.

The basic idea of the present invention is to improve the device and method as disclosed in the prior art in that ply bonding is achieved only at discrete locations, however, still using the irregular rough surface suggested in the prior art. Therefore, the disadvantageous irregular pattern is limited to discrete locations only thereby enhancing the overall visual appearance. In addition, the ply bonding technique of the invention may be incorporated into existing devices without the need of incorporating additional rollers or associated equipment, which also leads to the advantage that creating volume by embossing (e.g. by micro-embossing or by macro-embossing) can be achieved.

Accordingly, the apparatus of the present invention comprises a first roller having an outer periphery, a plurality of embossing protuberances being provided on the outer periphery such first roller being an embossing roller. Here, the embossing protuberances may be arranged irregularly or regularly on the outer periphery providing for a regular background embossing or a decorative embossing in which the discrete embossing protuberances compliment one another to for example form a graphic representation (i.e. a dolphin, a flower, a feather etc.). Such embossing rollers can be used for micro, macro, goffra incolla or nested embossing techniques or combinations thereof. The first roller, i.e. the embossing roller should be a metal roller, preferably a steel roller. The first roller (embossing roller) can be hardened.

In addition, the apparatus of the present invention comprises a second roller having an outer periphery and being elastic or flexible at least in a radial direction and together with the first roller forming a nip through which the at least two plies are to be fed. In this context, the second roller may be the marrying roller or the counter roller of pre-existing systems. The second roller should comprise a hard surface layer based on a flexible and elastic support layer so that the second roller is flexible and reversible regarding deformation. In addition, such a second roller should also comprise a core normally made of hard materials such as steel.

Furthermore, the present invention provides an irregularly rough surface on at least part of the outer periphery of at least one of the first and the second roller wherein the irregularly rough surface is arranged on the respective roller so that the at least two plies are bonded at discrete locations only, namely at the locations corresponding to at least some of the embossing protuberances. These features, on the one hand, enable the apparatus to achieve ply bonding between at least two plies of tissue paper which is sufficiently strong to hold the plies together and, on the other hand, enables, in only one device, to obtain an, in regard of the visual appearance, advantageous embossing pattern and achieve ply bonding by means of the irregularly rough surface. Due to the fact that the ply bonding is obtained only at discrete locations corresponding to at least some of the embossing protuberances, no irregularly background imparting over the entire surface of the plies exists so that the overall appearance of the multiply product achieved by the present invention is improved at the same time imparting an embossing to the plies to increase the bulk.

In one particular embodiment of the present invention, the embossing protuberances have a top surface opposite to (facing) the outer periphery of the second roller and the irregular rough surface is disposed on the top surfaces of at least some and possibly all embossing protuberances.

Further, it is possible to provide the first roller with at least two kinds of embossing protuberances, namely first protuberances having a first height in a radial direction of the first roller and second protuberances having at least a second height in the radial direction of the first roller, the first height being larger than the second height. In this context, the lower protuberances, i.e. second protuberances, may form a regular background pattern and the first protuberances having the larger height may form the aforesaid decorative or graphic pattern. In this particular case, it is preferred that the irregular rough surface is disposed on the top surfaces of at least some of the first protuberances only, though it is also possible to provide the irregular rough surface on all protuberances, i.e. the first and second protuberances. It is advantageous, if the ply bonding is not achieved at all, but only at some of the first protuberances, because the plies are then shiftable relative to each other in the unbonded areas. This leads to a softer feeling and an increased bulk. As far as the configuration of different kinds of protuberances on the outer periphery of an embossing roller are concerned, the skilled person is referred to for example EP-A-0 765 215.

In another particular embodiment of the present invention, it is preferred that the irregular rough surface is disposed on at least part of the outer periphery of the second roller opposite to the embossing protuberances. In this context, it is even conceivable to cover the entire outer periphery of the second roller with the irregular rough surface because only the top surfaces of the protuberances will form the nip together with the outer periphery of the second roller so that ply bonding is achieved only at the discrete locations. This particular embodiment may be alternative to the particular embodiments named above but it may even be preferred to combine these embodiments.

The irregular rough surface may be disposed onto the outer surface of either the first roller or the second roller by using ordinary techniques such as flame spraying, thermospraying processes, laser sintering or galvanic application techniques. If the irregular rough surface is to be disposed onto the surface of the second roller, it is also possible to insert hard particles onto or into the rubber material by kneading before such rubber material is being coated onto the core of the second roller. If such hard particles are being added to the rubber material by kneading the rubber at the time it is still deformable, such hard particles may be located in the surface of the rubber layer as well as beyond its surface. In case that the upper part of the surface of the rubber layer will be removed during ply bonding due to abrasive forces, the second roller still has a rough surface because the sublayer located beyond the surface of the rubber layer also comprises hard particles.

The second roller may be a rubber roller having at least one rubber layer. However, it is also preferred to use a multilayer rubber roller as described for example in DE-U-20 2007 006 100 or to use a so called paper roller, a steel roller coated with compressed paper.

Alternatively, it is also conceivable to use a metal plated rubber roller such as the marrying rollers sold by Fabio Perini (WO 2004/065113).

The rubber used in the second rubber rollers (counter rollers or marrying roller) should be an elastic material and may be selected from the group consisting of NR (natural rubber), EPDM (ethylen-propylen-dien-caoutchouc), NBR (nitrile-butadien-rubber) and PU (polyurethane). The rubber may contain fillers like suede or graphite, carbon black, silica caolin, dyes and pigments as well as aging inhibitors. Further additives are catalysts, activators, plasticizers or cross-linking agents.

If the second roller is a counter roller, such counter roller may consist either of rubber, of paper or of metal. If the counter roller consists of rubber, it is preferred that such second roller has a hardness at the outer periphery between 25 and 80, preferably between 35 and 70, most preferably of about 50 Shore A. If such roller consists of paper, it is preferred that compressed paper should be used. If such roller consists of metal, it is preferred that steel should be used. The surface of such counter roller may be either flat or structurized and should preferably comprise the negative shape of the embossing roller, so that the counter roller and the embossing roller match with each other.

In case the second roller is the marrying roller of pre-existing systems, it is preferred that the second roller has a hardness at the outer periphery between 80 Shore A and 80 Shore D, preferably between 90 Shore A and 70 Shore D, most preferably of between 95 Shore A and 60 Shore D. Preferably a marrying roller is used, whereby a core made of steel is coated with a flexible middle layer and onto said middle layer an additional layer made of metal is being coated. If such a marrying roller is characterized by a rough surface, hard particles should be added onto the metallic outer layer of the marrying roller.

The hardness of so called elastic materials is in general determined according to the method of Shore (DIN 53505). The hardness of the material in general is a measure for the resistance of this material against the penetration of a harder solid body. In the method according to Shore different devices for determining the hardness are used for softer materials (Shore A) and harder materials (Shore D). This results in two hardness scales for softer materials in the range of 10-98 Shore A and for harder materials in the range of 30-90 Shore D. Suitable devices for measuring the hardness according to Shore A and Shore D are available from Zwick GmbH & Co., Ulm. Thereby conical penetration bodies are pressed against the material to be measured by about 2.5 mm, wherein the force needed for this penetration is measured. Based on the measured force the Shore hardness is calculated.

As previously mentioned, the irregular rough surface is of that kind used for sandpaper. Accordingly, it is preferred that the outer periphery of at least one of the first and the second rollers is entirely or partly covered with hard particles similar to that used for sandpaper, i.e. hard material.

In this context, it is particularly preferred that the hard particles are selected from the group consisting of ceramics, diamonds, corundum, silicon carbide, bore nitride, tungsten carbide, metal and aluminium oxide or combinations thereof. If is further preferred that the particles have a MOHS-hardness of 4 or more according to the MOHS-hardness scale.

Further, it is preferred that the particles have a size between 40 and 1000 μm. This size is particularly preferred from the view point of achieving connections between the individual fibres of the corresponding tissue plies to obtain fibres bonding. The granulation range is between P10 to P240, particularly P60 to P150 and more particularly between P100 and P140. The most preferred granulation range is P120 (DIN ISO 6344, volume 2000-04, Part 1-3).

In this context, it is the aim to make as many "roughness edges" available as possible per unit area of the tissue papers to produce ply adhesion. In this context, particular reference is made to WO-A-99/336646.

To enhance the ply bonding between the at least two plies, it is preferred to provide at least one discharge device upstream of the first and second rollers to electrically discharge at least one, preferably all plies. In this context, a copper garland may be used which hangs over the fed web constituting the plies. Alternatively, a high voltage discharge device may be used.

In addition, it may be appropriate to enhance the moisture level of the plies to be bonded which, on the one hand, has an advantageous effect with respect to the electrostatic charge of the tissue plies and, on the other hand, also enhances the strength of the ply bonding. For this purpose, it may be preferred to add a fluid applicator for applying a fluid with polar groups on at least one of the plies upstream of the first and second rollers to increase the fluid content of the ply. This fluid applicator may be formed by nozzles, a rotating disk system or a slot nozzle system. In addition slit bars may be used, wherein the tissue plies are moved over the bar. Also steam application or fog application are conceivable. In addition, the fluid applicator may be a simple fountain system.

Suitable fluids with a polar group are e.g. aliphatic or aromatic alcohols, aliphatic or aromatic carbon acids including their ester or amide or anhydride derivatives and aliphatic or aromatic amines including mixtures of such fluids. Preferably water is used as a fluid to be applied onto the ply. It is understood that such fluids should be liquid at such temperatures ranges at which ordinary embossing stations are being operated.

It is preferred that the fluid applicator is configured to apply the fluid on the ply at a plurality of discrete locations so as to increase the fluid content of the ply locally only. In particular, the fluid is applied locally only in the areas in which the two plies are bonded to increase the fluid content, preferably the water content only in these areas and improve the bonding strength. This may be achieved by an alternative possibility, namely in that the fluid applicator is configured for applying a fluid on at least some of the embossing protuberances of the first roller upstream of the nip between the first and second rollers to increase the fluid content of the ply locally. In context of these embodiments, it is to mention that the amount of fluid on the ply should reside in a local range of 0.1 to 30 $g/m^2$, preferably between 0.2 and 6 $g/m^2$ and more preferably between 0.5 and 3 $g/m^2$. These ranges should refer to local areas e.g. to embossing protuberances or ply bonding areas.

In this context and for cost reasons, it is preferred that the fluid is water. However the fluid may also be an ink, especially a water based ink. Most of the tissue products which are hitherto produced are printed.

In addition to the inventive apparatus, the present invention also suggests a method for bonding at least two plies of tissue paper comprising the steps of: transferring at least two plies between two rollers forming a nip and imprinting an irregular rough surface of at least one of the rollers into at least one of the plies at a plurality of discrete locations of the plies, so that the two plies are bonded together at the discrete locations, whereby one roller is an embossing roller with protuberances and the other roller is a counter roller or a marrying roller.

According to a preferred method for bonding plies, hard particles disposed on at least one of the rollers are imprinted into the plies. Ply-bonding is carried out mainly by using mechanical forces.

Further, the present invention also suggests a fibrous product obtainable by a method as explained above.

The fibrous product of the invention comprises at least two plies of a fibrous web, wherein at least one of the plies has an embossed pattern of discrete embossing elements. The two plies are mechanically bonded together without the use of adhesive or glue, on at least some of the embossing elements. According to the inventive fibrous product, the area of the product in which the embossing elements at which the two plies are bonded together are located has a non-uniform transparency. In this context, it is to be mentioned that the embossing elements at which the two plies are bonded define an area of the product at which the two plies are bonded together. This area at different locations of the area has a different transparency. That is at least two different transparencies are located within that area.

Contrary to fibrous tissue products of the prior art such as hankies or facials, whereby the plies are being bonded together by mechanical means without using adhesives or contrary to tissue products whereby ply bonding is carried out by using ultra radiation, the fibrous products of the present invention are further characterized by a transparency which is different in terms of location onto the protuberances (non-uniform). In addition, the fibrous products of the present invention are characterized by an improved visual appearance.

Preferably, the two plies are bonded together only at the at least some of the embossing elements and, as previously mentioned with respect to the apparatus and method for manufacturing the product, the product is at least colored in the area in which the plies are bonded, that is in the area where the embossing elements at which the two plies are bonded together are located.

The products according to the present invention are characterized by an extraordinary high ply-bonding strength if such products contain no or just a low amount of wet strength agents.

Further features and advantages as well objects of the present invention will become apparent from the following description of preferred embodiments.

BRIEF DESCRIPTION OF THE DRAWINGS

The description of the particular embodiments of the present invention makes reference to the accompanying drawings in which.

Throughout the figures the same or equivalent elements are referred to by the same reference numerals.

It is understood that in addition to the embossing steps described in the detailed description other converting steps such as printing, application of additives, lotions or scents, cutting, perforating or folding may be carried out.

DETAILED DESCRIPTION OF THE PREFERRED EMBODIMENTS

Figure 1A:
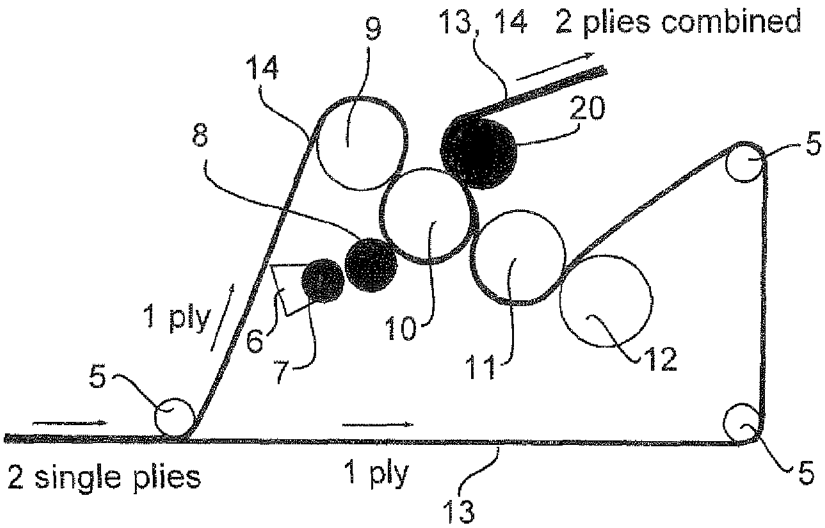
FIG. 1*a* shows a schematic view of an inventive apparatus according to a first embodiment of the present invention and FIG. 1*b* shows a product obtained by using the apparatus of FIG. 1*a;*

FIG. 1*a* shows an apparatus according to a first embodiment of the present invention. Such apparatus in its structural features beside the following differences is similar to an apparatus for embossing and ply bonding in a nested configuration. In regard of these prior art apparatuses reference is made to for example WO-A-2006/136 186.

The inventive apparatus comprises a first roller 10 and a second roller 20.

The first roller 10 is an embossing roller made of steel. The embossing roller comprises a plurality of the embossing protuberances (not shown) being provided on the outer periphery. In one preferred embodiment, the embossing protuberances have top surfaces covered with hard particles having a granulation of P120 (DIN ISO 6344, volume 2000-04 part 1-3).

The second roller 20 is a marrying roller and may be formed of rubber the outer periphery being covered by a metal layer (e.g. metal plated rubber roller of Fabio Perini (WO 2004/065113). The outer surface of the marrying roller 20 may entirely be covered with the same or another abrasive material.

Additionally, there is provided a counter roller 9 for the embossing roller 10 which is made of rubber.

The apparatus shown in FIG. 1*a* further comprises a second embossing roller 11 having embossing protuberances on an outer periphery and a counter roller 12 made of rubber. The embossing roller 10 and the embossing roller 11 are associated to each other so that the corresponding embossing protuberances match. A small gap should be between the embossing rollers 10 and 11.

An applicator for applying fluid, especially a water based fluid on the one side of one ply is provided in association with the embossing roll 10. This applicator comprises a fluid applicator roller 8, an anilox roller 7 and a fluid reservoir 6 (doctor chamber). Such a common fluid applicator may be used to apply fluid, wherein preferably a fluid comprising ink is used. Such application systems for fluids normally consists of an applicator roller, a transfer roller and a reservoir of fluid and can also be designed as a so-called immersion roll system in which the transfer roller is immersed into the reservoir of fluid and transports fluid by means of surface tension and adhesive forces out of the reservoir of fluid. By adjusting the gap between the transfer roller and the applicator or application roller, the amount of fluid to be applied can be adjusted. Application rollers may be structured rollers. Transfer rollers having defined pit-shaped depressions in their circumferential surface can also be used. Such transfer rollers are known as anilox-rollers. Such a roller is usually made of ceramic material or it is a roller made of steel or copper and coated with chromium. Excessive fluid is removed from the surface of the anilox-roller by means of a blade. The amount of fluid is determined by the volume, the number of depressions and the difference in speed between the anilox roller and the applicator roller. Alternative application systems are based on a spraying equipment (e.g. Weko-technique, Dynatee) or contract systems like slot dyes (Nordson).

The two plies are guided through the corresponding roller nips by means of several guide rollers 5. Additionally web tension control systems (not shown) can be useful.

The function of the apparatus as shown in FIG. 1*a* is as follows.

Two single plies are fed to the apparatus and separated at the first guide roller 5, one of the plies 14 being guided around (this is not essential, also other guiding paths are conceivable) the rubber roller 9 and the other ply 13 being guided via other guide rollers 5 to a nip formed between the second embossing roller 11 and the second counter roller 12. Between this nip a first embossing pattern is imparted to the ply 13. The other ply 14 is transferred into the nip between the counter roller 9 and the first embossing roller 10 to form a second embossing pattern on the ply 14.

Then water or a water based ink is taken from the reservoir 6 and transferred by means of the anilox roller 7 from the reservoir 6 to the applicator roller 8. The applicator roller 8 then transfers the water based fluid (water or water based ink) on the side of the ply 14 which faces the applicator roller 8. Preferable amounts of fluid reside within 0.1 to 30 g/m$^2$, 0.2 to 6 g/m$^2$ and most preferably between 0.5 to 3 g/m$^2$. Such fluid should preferably be applied locally and not on the entire surface of the ply. In addition, because of the transfer into the nip performed between the rubber roller 9 and the embossing roller 10, only areas of the ply corresponding to the top surfaces of the embossing protuberances on the embossing roller 10 come in contact with the outer periphery of the applicator roller 8 so that only these parts of the ply 14 are moistened or printed by the water based ink. Then both plies 14 and 13 subsequently are bonded in the nip formed between the embossing roller 10 and the marrying roller 20. In this nip the hard particles on the top surfaces of the embossing protuberances of the embossing rollers 10 at least partly penetrate into the fibre structure of the two plies 13, 14 so that fibres of both webs are interconnected. As the hard particles are only provided on the top surfaces of the protuberances on the embossing roller 10, the ply bonding is only achieved in these areas.

Afterwards, the two plies being combined leave the marrying roller 12 and are further processed and converted to a final product.

Figure 1B:
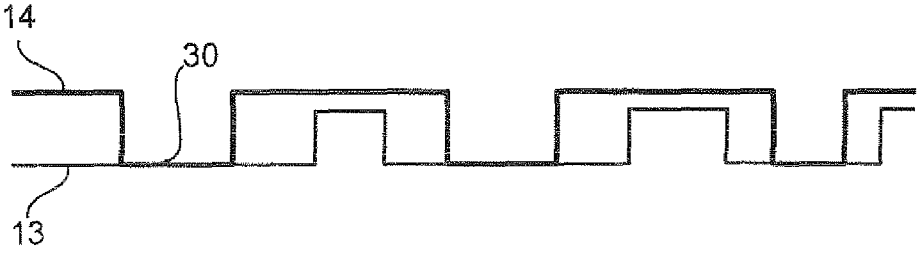

FIG. 1*b* discloses the product obtained by using the apparatus of FIG. 1*a*. Plies 14 and 13 are being bonded together at depressions (30) (referring to the protrusions of the embossing roller) of ply 14. These ply bonding areas are colored because a water-based fluid comprising ink is being applied onto the embossing roller 10.

Figure 2A:
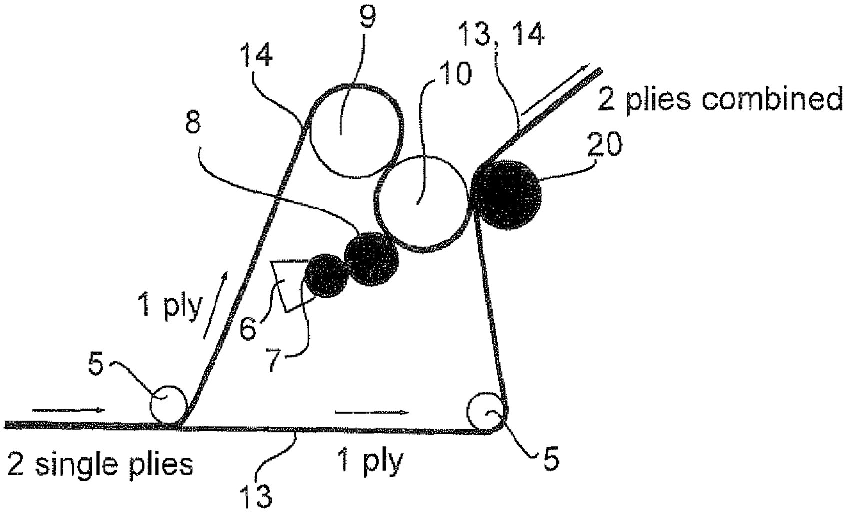
FIG. 2*a* shows a schematic view of an inventive apparatus according to a second embodiment of the present invention and FIG. 2*b* shows a product obtained by using the apparatus of FIG. 2*a*.

The embodiment shown in FIG. 2*a* differs from the apparatus shown in FIG. 1*a* in that a so called Goffra Incolla apparatus is used as the basis. This apparatus comprises the same elements as the apparatus in FIG. 1*a* but omits the second embossing roller 11 and its counter roller 12.

In this apparatus the first ply 14 is guided into a nip between the rubber roller 9 and the embossing roller 10, the rubber roller 9 being the counter roller. The embossing roller 10 has background embossing protuberances of height h2 and décor embossing protuberances of height h1, whereby h1>h2. The heights of the background embossing protrusions are preferably between 0.2 and 0.8 mm lower than those of the décor embossing protrusions. In this nip an embossing pattern is imparted on the first ply 14 by the protuberances provided on the outer periphery of the embossing roller 10. As in FIG. 1*a* water or water based ink is applied to the ply 14 in an area corresponding to the top surfaces of the first protuberances, wherein a difference in the circumferential speed of the transfer roller and the applicator roller is adjusted. Subsequently, the first ply 14 and the second ply 13 are brought together in a nip between the embossing roller 10 and a marrying roller 20, wherein the top surfaces of the protuberances of the embossing roller 10 and/or the outer periphery of the marrying roller 20 is provided with hard particles. In any case, because the nip between the roller 10 and the marrying roller 20 is only formed between the top surfaces of the protuberances and the outer periphery of the marrying roller 20 enough pressure for the hard particles to penetrate into at least part of both plies is only achieved at the areas of the top surfaces of the first embossing protuberances (e.g. if the marrying roller has a diameter of 260 mm and the embossing roller 10 has a diameter of 280 mm a nip of 8-10 mm is adjusted, the marrying roller having a rubber hardness of 95 Shore A and a 1.5 mm thick steel band). So the ply bonding is only achieved in these areas. Subsequently, both plies being combined are further transferred to other processing steps, if required.

Figure 2B:
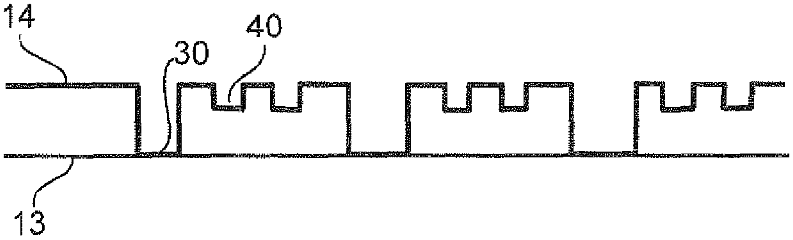

FIG. 2*b* discloses a two ply product obtained by using the apparatus of FIG. 2*a*. Plies 14 and 13 are being bonded together at depressions 30 (referring to the first protrusions of the embossing rollers) of ply 14. Ply 14 comprises smaller depressions 40 which do not contribute to the ply bonding because these depressions 40 have a reduced height compared to depressions 30.

An alternative apparatus is shown in FIG. 3. Compared to the apparatus shown in FIG. 2 the apparatus of FIG. 3 omits the rubber roller 9.

Instead, the first ply 14 is transferred into the nip between the applicator roller 8 and the embossing roller 10 to apply the water based fluid on the side of the ply 14 in the areas corresponding to the top surface of the protuberances of the embossing roller 10. Then, the second ply 13 together with the first ply 14 are being transferred into the nip and bonded together in the nip between the embossing roller 10 and the rubber roller 20, ply bonding is achieved in the areas corresponding to the top surfaces of the embossing protuberances. There is no or only a slight embossing achieved. For this purpose, either the top surfaces of the embossing protuberances and/or the entire outer periphery of the marrying roller 20 are coated with hard particles.

Figure 3A:
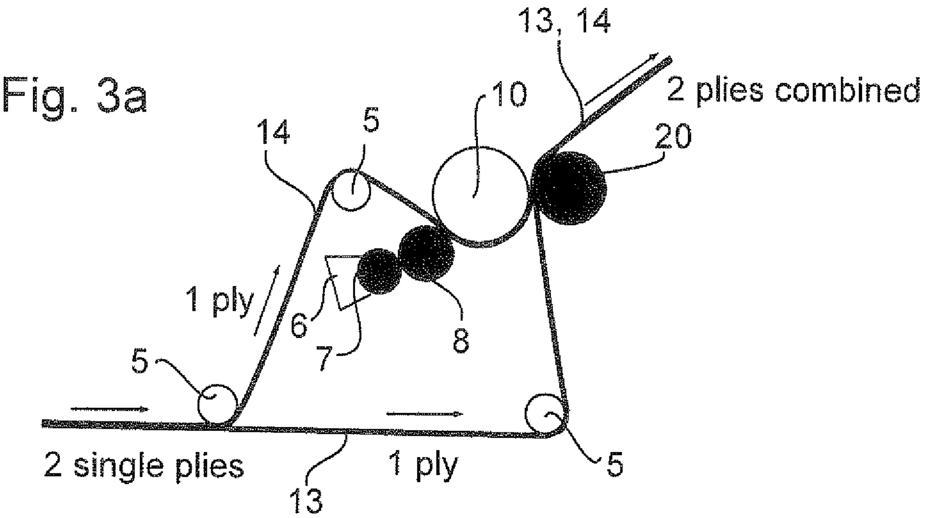
FIG. 3*a* shows a schematic view of an inventive apparatus according to a third embodiment of the present invention and FIG. 3*b* shows the respective product.
Figure 3B:
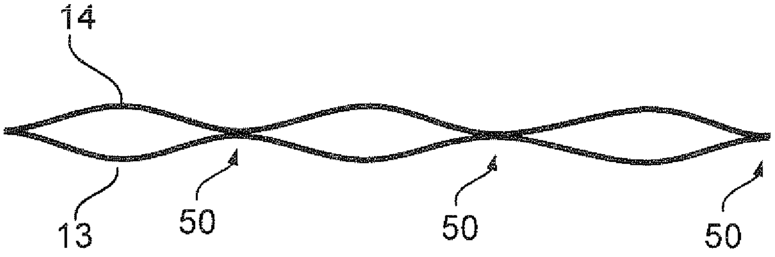

FIG. 3*b* discloses a two ply product obtained by using the apparatus of FIG. 3*a*. Plies 14 and 13 are being bonded together at areas 50 which do not show the typical shape of embossing protrusions because neither ply 14 nor ply 13 is characterized by an embossing pattern.

The invention claimed is:

1. An apparatus for bonding at least two plies of a fibrous web, comprising:

an embossing roller with an outer periphery having a plurality of embossing protuberances being provided on the outer periphery; and a second roller, being a counter roller or a marrying roller, with an outer periphery and being elastic at least in a radial direction and together with the embossing roller forming a nip through which the at least two plies are to be fed, wherein at least a part of the outer periphery of at least one of the embossing roller and the second roller has an irregularly rough surface of a profile distinct from the embossing protuberances, and the at least two plies are bonded only at discrete locations corresponding to at least some of the embossing protuberances.

2. The apparatus as set forth in claim 1, wherein the embossing protuberances have a top surface opposite to the outer periphery of the second roller, the irregular rough surface being disposed on the top surfaces of at least some embossing protuberances.

3. The apparatus as set forth in claim 2, wherein the embossing protuberances comprise first protuberances having a first height in a radial direction of the first roller and second protuberances having at least a second height in the radial direction of the first roller, the first height being larger than the second height and the irregular rough surface being disposed on the top surfaces of at least some of the first protuberances.

4. The apparatus as set forth in claim 1, wherein the irregular rough surface is disposed on at least the part of the outer periphery of the second roller opposite to the embossing protuberances.

5. The apparatus as set forth in claim 1, wherein the second roller is a rubber roller having at least one rubber layer.

6. The apparatus as set forth in claim 1, wherein the second roller is a at least partly metal plated rubber roller.

7. The apparatus as set forth in claim 5, wherein the rubber is selected from the group consisting of NR, EPDM, NBR and PU.

8. The apparatus as set forth in claim 1, wherein the second roller has a hardness at the outer periphery between 80 Shore A and 80 Shore D.

9. The apparatus as set forth in claim 1, wherein hard particles are disposed on at least a part of the outer periphery of at least one of the embossing roller and the second roller to form the irregular rough surface.

10. The apparatus as set forth in claim 9, wherein the hard particles are selected from the group consisting of ceramics, tungsten carbide, diamonds, corundum, silicon carbide, bore nitride, metal and aluminium oxide and combinations thereof.

11. The apparatus as set forth in claim 9, wherein the hard particles have a size between 40 and 1000 μm.

12. The apparatus as set forth in claim 9, wherein the hard particles are also located below the outer periphery of the second roller.

13. The apparatus as set forth in claim 1, wherein the embossing roller is a steel roller.

14. The apparatus as set forth in claim 1, further comprising at least one discharge device upstream of the embossing roller and the second roller.

15. The apparatus as set forth in claim 1, further comprising a fluid applicator for applying a fluid with polar groups on at least one of the plies upstream of the nip between the embossing roller and the second roller to increase the fluid content of the ply.

16. The apparatus as set forth in claim 15, wherein the fluid applicator is configured to apply the fluid on the ply at a plurality of discrete locations so as to increase the fluid content of the ply locally.

17. The apparatus as set forth in claim 1, further comprising a fluid applicator for applying a fluid with polar groups on at least some of the embossing protuberances of the embossing roller upstream of the nip between the embossing roller and the second roller to increase the fluid content of the ply locally.

18. The apparatus as set forth in claim 15, wherein the fluid is water.

19. The apparatus as set forth in claim 16, wherein the fluid is water based ink.

20. A method for bonding at least two plies of a fibrous web comprising the steps of:

transferring at least two plies between a nip formed by an embossing roller having a plurality of embossing protuberances and another roller, and imprinting an irregular rough surface of at least one of the embossing roller and the another roller into at least one of the plies at a plurality of discrete locations of the ply, so that the two plies are bonded together only at the discrete locations, whereby the irregularly rough surface has a profile distinct from the embossing protuberances, and the other roller is a counter roller or a marrying roller.

21. The method as set forth in claim 20, wherein the irregular rough surface is formed of hard particles which are imprinted into the plies.

22. A fibrous product comprising at least two plies of a fibrous web, at least one of the plies having an embossed pattern of discrete embossing elements, wherein the plies are bonded together mechanically only at at least some of the embossing elements, wherein only the area of the product in which the pattern of discrete embossing elements are located, at which the plies are bonded together, has a non-uniform transparency.

23. The fibrous product according to claim 22, wherein the product is colored at least partly in some of the embossing areas.

24. The fibrous product obtainable by a method according to claim 20.

25. The apparatus as set forth in claim 8, wherein the second roller has a hardness at the outer periphery between 90 Shore A and 70 Shore D.

26. The apparatus as set forth in claim 25, wherein the second roller has a hardness at the outer periphery between 95 Shore A and 60 Shore D.

* * * * *